US008260280B2

(12) United States Patent
Lim et al.

(10) Patent No.: US 8,260,280 B2
(45) Date of Patent: Sep. 4, 2012

(54) SYSTEM AND METHOD FOR THE SYNCHRONIZED TRANSMISSION OF TONE SEQUENCES

(75) Inventors: Miranda Bing Ying Lim, Nepean (CA); Brian Alexander Oliver, Fergus (CA); Gibran Siddique, Toronto (CA); Valentina Iqorevna Kramarenko, Toronto (CA)

(73) Assignee: Research In Motion Limited, Waterloo (CA)

( * ) Notice: Subject to any disclaimer, the term of this patent is extended or adjusted under 35 U.S.C. 154(b) by 245 days.

(21) Appl. No.: 12/693,108

(22) Filed: Jan. 25, 2010

(65) Prior Publication Data
US 2011/0183665 A1  Jul. 28, 2011

(51) Int. Cl.
*H04M 3/00* (2006.01)
*H04M 1/24* (2006.01)
*H04W 4/00* (2009.01)

(52) U.S. Cl. .................. 455/418; 455/426.1; 379/32.01

(58) Field of Classification Search .................. 455/418
See application file for complete search history.

(56) References Cited

U.S. PATENT DOCUMENTS

| 5,235,634 | A | 8/1993 | Oliver |
| 5,396,548 | A | 3/1995 | Bayerl |
| 5,544,241 | A | 8/1996 | Dibner et al. |
| 5,699,417 | A | 12/1997 | Khojasteh |
| 5,734,706 | A | 3/1998 | Windsor |
| 6,058,171 | A | 5/2000 | Hoopes |
| 6,208,715 | B1 * | 3/2001 | Haavisto ............... 379/88.07 |
| 6,320,879 | B1 | 11/2001 | Bremer |
| 6,574,468 | B1 | 6/2003 | Tanaka |
| 6,766,004 | B1 * | 7/2004 | Chiloyan ................ 379/142.15 |
| 7,184,542 | B2 | 2/2007 | Sauvage et al. |
| 7,233,605 | B1 | 6/2007 | Oran |
| 2005/0129203 | A1 * | 6/2005 | Elcock et al. ............ 379/142.11 |
| 2007/0206735 | A1 | 9/2007 | Silver et al. |
| 2008/0317238 | A1 | 12/2008 | Cai et al. |

OTHER PUBLICATIONS

Extended European Search report dated Jul. 2, 2010. In corresponding application No. 10151558.3.
Public Switched Telephone Network (PSTN); Protocol over the local loop for display and related services; Terminal Equipment requirements; Part 1: off-line data transmission; ETS 300778-1' ETSI Standards, LIS Sophia Antipolis CEDEX, France, vol. AT, Sep. 1, 1997, XP014014498 ISSN:0000-0001 figure 3, section 42.1.2 Data transmission during ringing.
Residential SIP telephony feature definition; J. 460.0 (Jun. 2008), ITU-T Standard, International Telecommunication Union, Geneva, CH, No. J. 460.0 (Jun. 2008), Jun. 13, 2008, XP017433995, section II.6.2.1 Calling Number Delivery and calling name delivery.

* cited by examiner

*Primary Examiner* — Lester Kincaid
*Assistant Examiner* — Andy Gu
(74) *Attorney, Agent, or Firm* — Novak Druce + Quigg LLP

(57) ABSTRACT

A computer implemented method for transmitting dual tone multi-frequency (DTMF) tones is disclosed. The method includes sending an indication to a mobile device to start a cyclic ring tone including ring and pause periods. The delay incurred to send a DTMF tone to the mobile device is estimated. The server schedules the transmission of the DTMF tone to be received at the mobile device during a pause period of the cyclic ring tone and the DTMF tone is sent as scheduled.

22 Claims, 9 Drawing Sheets

US 8,260,280 B2

SYSTEM AND METHOD FOR THE SYNCHRONIZED TRANSMISSION OF TONE SEQUENCES

BACKGROUND

1. Field

The present application relates to voice communications and more particularly to status updating and controlling of voice communications between an enterprise call server and a mobile device.

2. Related Art

Private Branch Exchanges (PBX) have been used to provide enterprise telecommunication capabilities to phones co-located with the PBX. More recently, PBXes have been implemented using more general-purpose computing architectures, add-in cards, and software, coincident with the adoption of voice over Internet Protocol (VOIP). Still more recently, it has become increasingly common to desire to provide enterprise communications capabilities to mobile devices, as mobile devices have become an ever more integral means of communication for enterprise workers. In order to provide some services to mobile devices, PBXes may need to exchange control and status information with the mobile devices. Communication with mobile devices continues to present challenges that are not of much concern with wired telephony over the PSTN, or even in VoIP wired telephony. Therefore, continued advancements in such communications continue to be desired.

BRIEF DESCRIPTION OF THE DRAWINGS

Reference will now be made, by way of example, to the accompanying drawings which show example embodiments of the present application, and in which.

DESCRIPTION

Figure 1:
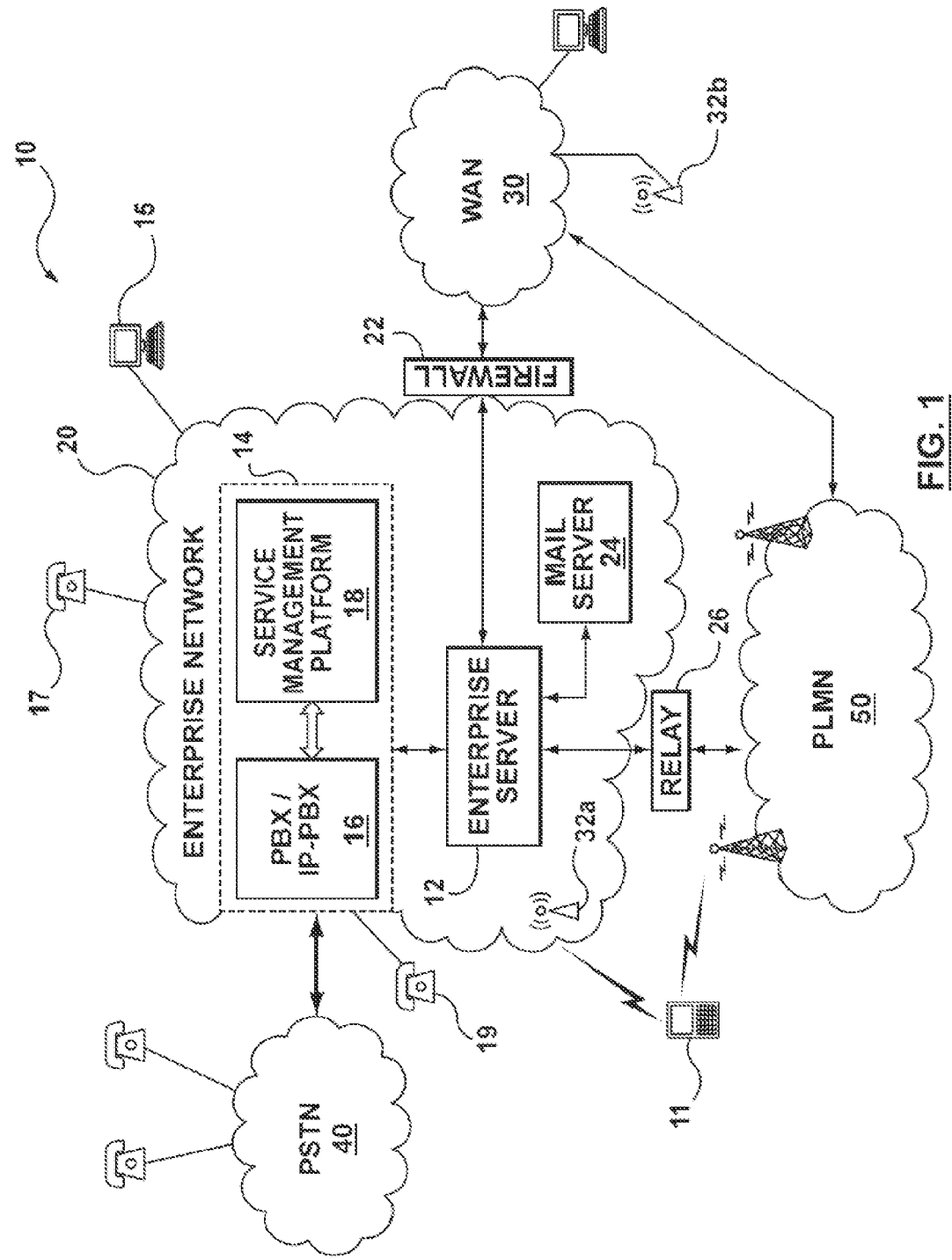
FIG. 1 shows, in block diagram form, an example system for managing enterprise-related mobile calls, including an enterprise communications platform.

The following description sets forth examples of aspects relating to providing information, such as status and control information, from a server (e.g., a server functioning as a PBX, in that it can provide telephony services) to a mobile device. In a particular aspect, this disclosure principally is relevant to mobile devices that have trouble detecting Dual Tone MultiFrequency (DTMF) tones over a voice channel while the devices are producing a DTMF tone that is to be heard locally by a user of the device. For example, some mobile devices have difficulty in reliably detecting DTMF tones sent on a voice channel while producing a ring progress tone. Still further, although it may be possible in some instances to have a data channel between the server and the mobile device, over which most of such status and control information can be transmitted, such data channel may not always be available.

Aspects related to these examples will become apparent to those of ordinary skill in the art from a review of the following detailed description in conjunction with the drawings. Embodiments of the present application are not limited to any particular operating system, server architecture, or computer programming language.

The present application relates to the control, status updating, and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

To initiate communication between mobile devices using mobile private branch exchange (PBX) server mobility the client-server must first be contacted by inputting a desired mobile device phone number. Once a call between a mobile device and the PBX server is connected, the server may send messages to perform control and status updating. In some cases, the data sent for such control and status updating can be sent by transmitting a dual-tone multi-frequency (DTMF) tone sequence over a voice communication path.

For instance, if the mobile device does not have access to an active data communication path, enterprise call control is performed by transmitting a DTMF tone sequence over a voice communication path. One scenario involves where a mobile device (party A) can signal a PBX to call a party B device, and then bridge the call leg between the PBX and party A and the call leg between PBX and party B. One aspect of call status that is communicated to party A by the PBX is that the party B device has begun to ring. In response, the party A device should generate a ring tone, which for these purposes comprises a repeating (cyclic) pattern of ring and pause periods.

In some cases, if the PBX wants to send party A further control or status messages using DTMF tones, the party A device would be generating the ring tone. It has been found that some devices do not reliability detect such DTMF tones during the ring period. Therefore, this disclosure relates to a way to cause a server (PBX) to schedule DTMF tones over a voice channel so that they are more likely to be processed at the mobile device during a pause period, and hence more likely to be detected.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
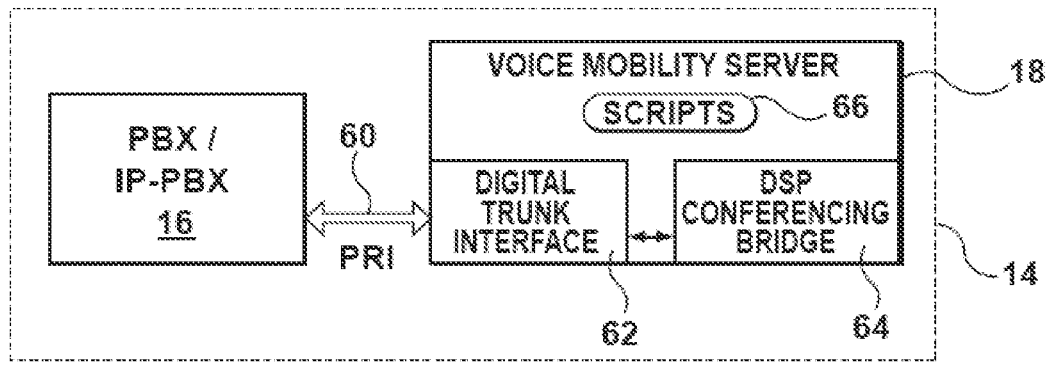
FIG. 2 shows, in block diagram form, further details of an embodiment of the enterprise communications platform.
Figure 3:
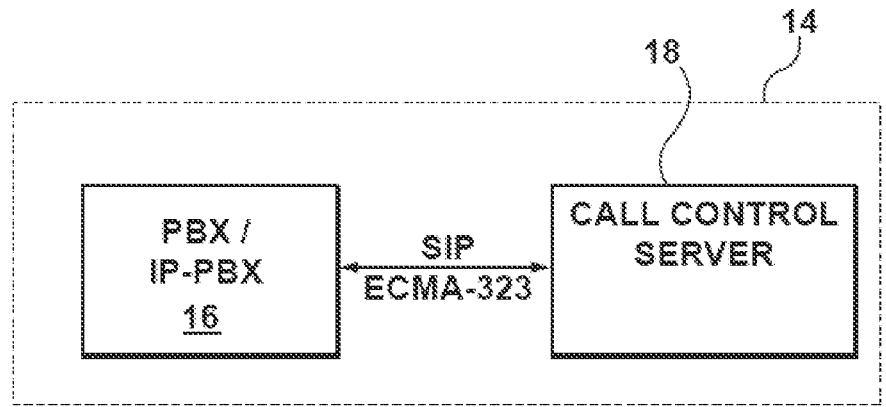
FIG. 3 shows another embodiment of the enterprise communications platform.
Figure 4:
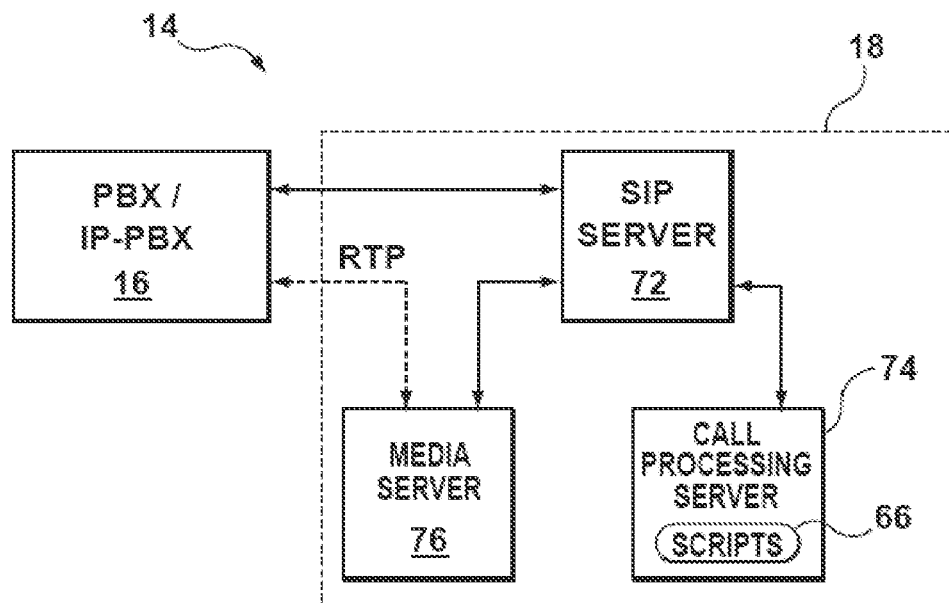
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
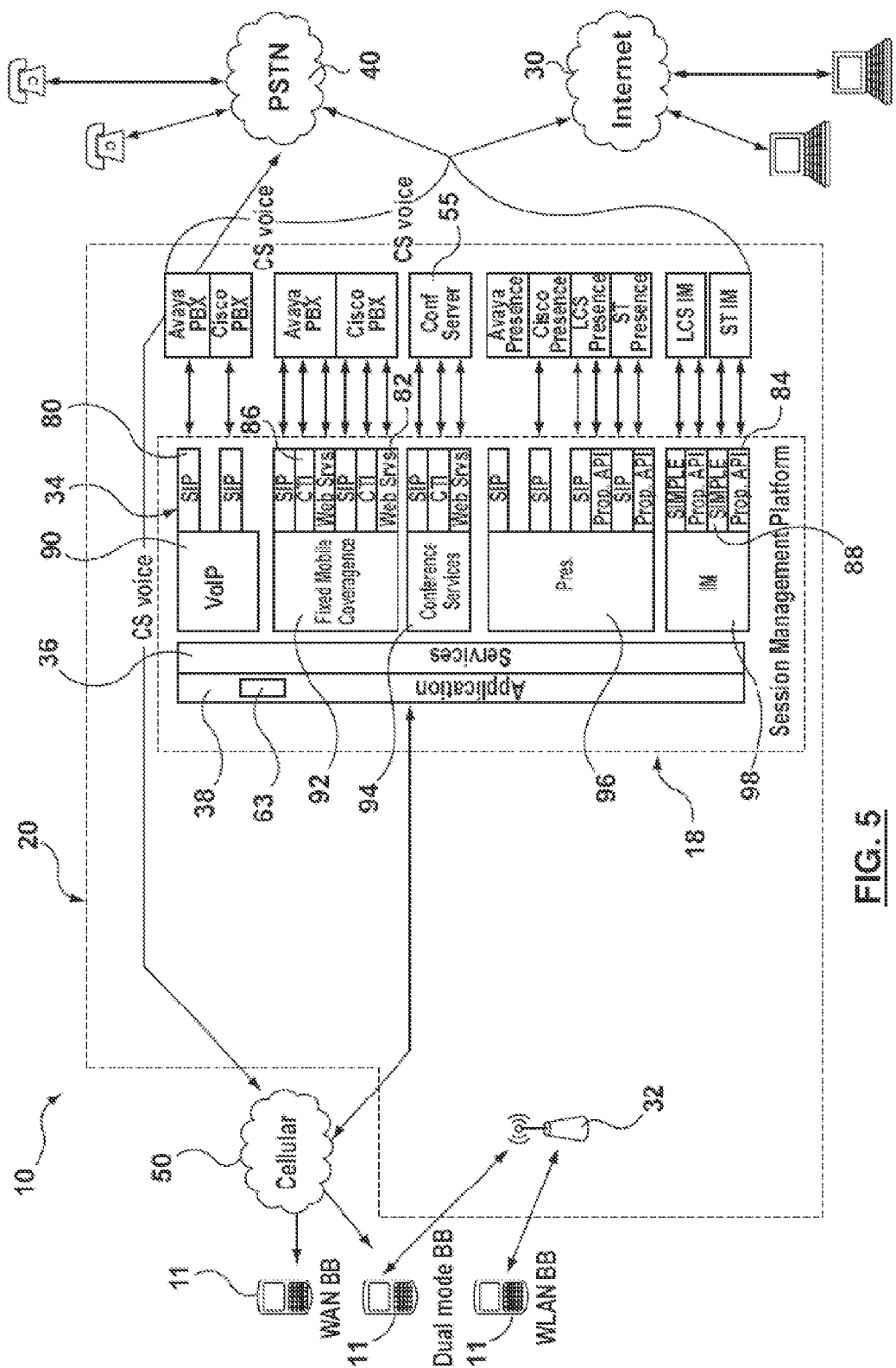
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIG. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

Figure 6A:
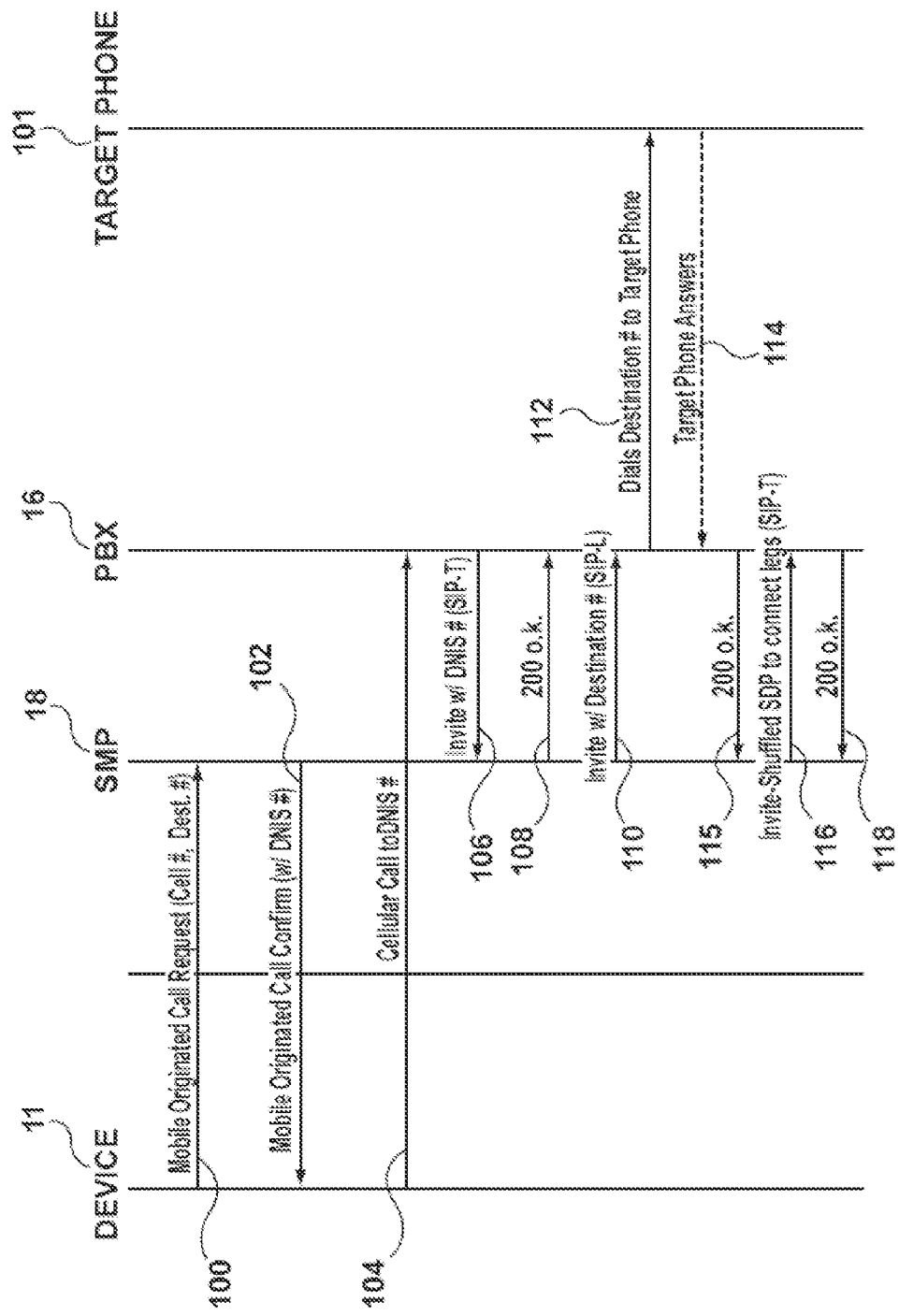
FIG. 6A is a signaling diagram generally indicating how mobile-originated, mobile-initiated calls are processed by the network of FIG. 5.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it will be necessary to localize the ringing tone to match the tone normally heard with a call through the PBX 16.

Figure 6B:
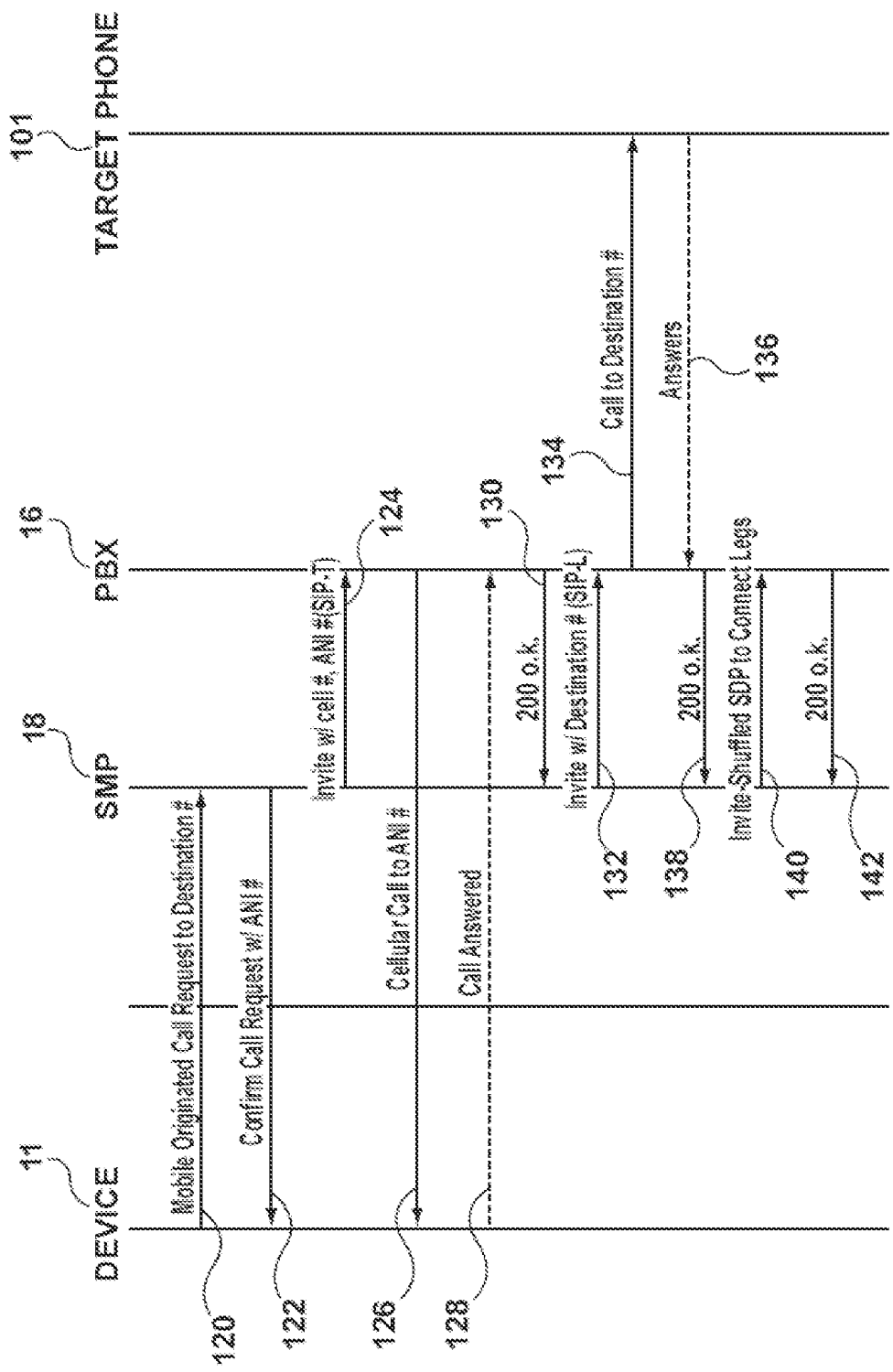
FIG. 6B is a signaling diagram generally indicating how mobile-originated, PBX-initiated, calls are processed by the network of FIG. 5.

The above description is known as a "mobile initiated" call, because the SMP 18 provides the mobile device 11 with the DNIS number into which the mobile device 11 has called. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an ANI number (block 122), which the mobile device uses to identify the incoming call from the PBX 16. The PBX 16 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 7A:
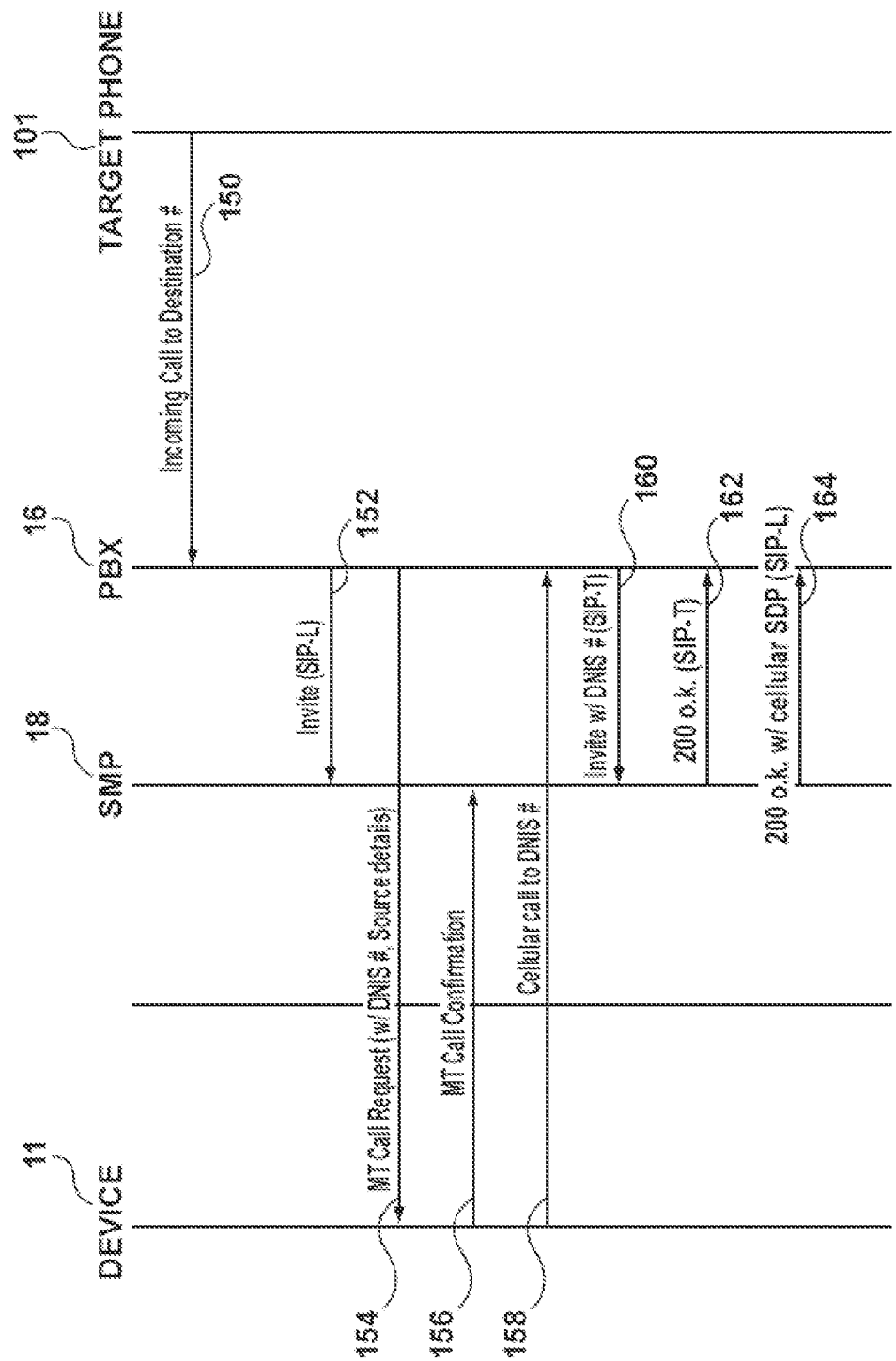
FIG. 7A is a signaling diagram generally indicating how mobile-terminated, mobile-initiated calls are processed by the network of FIG. 5.
Figure 7B:
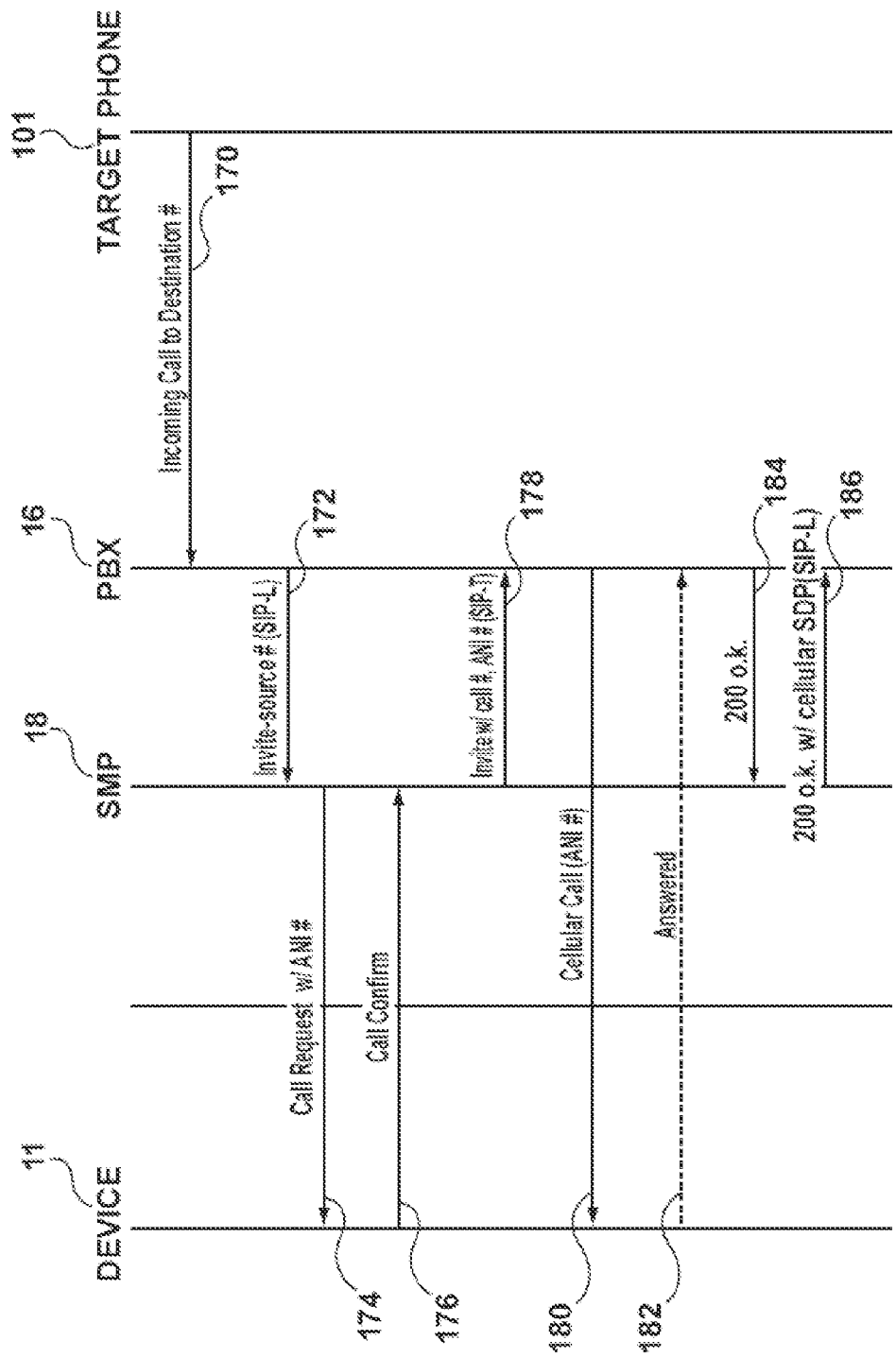
FIG. 7B is a signaling diagram generally indicating how mobile-terminated, PBX-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call, which will send a call to the mobile device. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the DNIS number at the PBX 16 into which to call. However, it is also possible to employ a "PBX-initiated" mobile terminated call, as shown in FIG. 7B, where the PBX 16 sends an incoming call to the device 11 with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 6A and 6B, the SMP 18 remains in control of the signaling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

Figure 8:
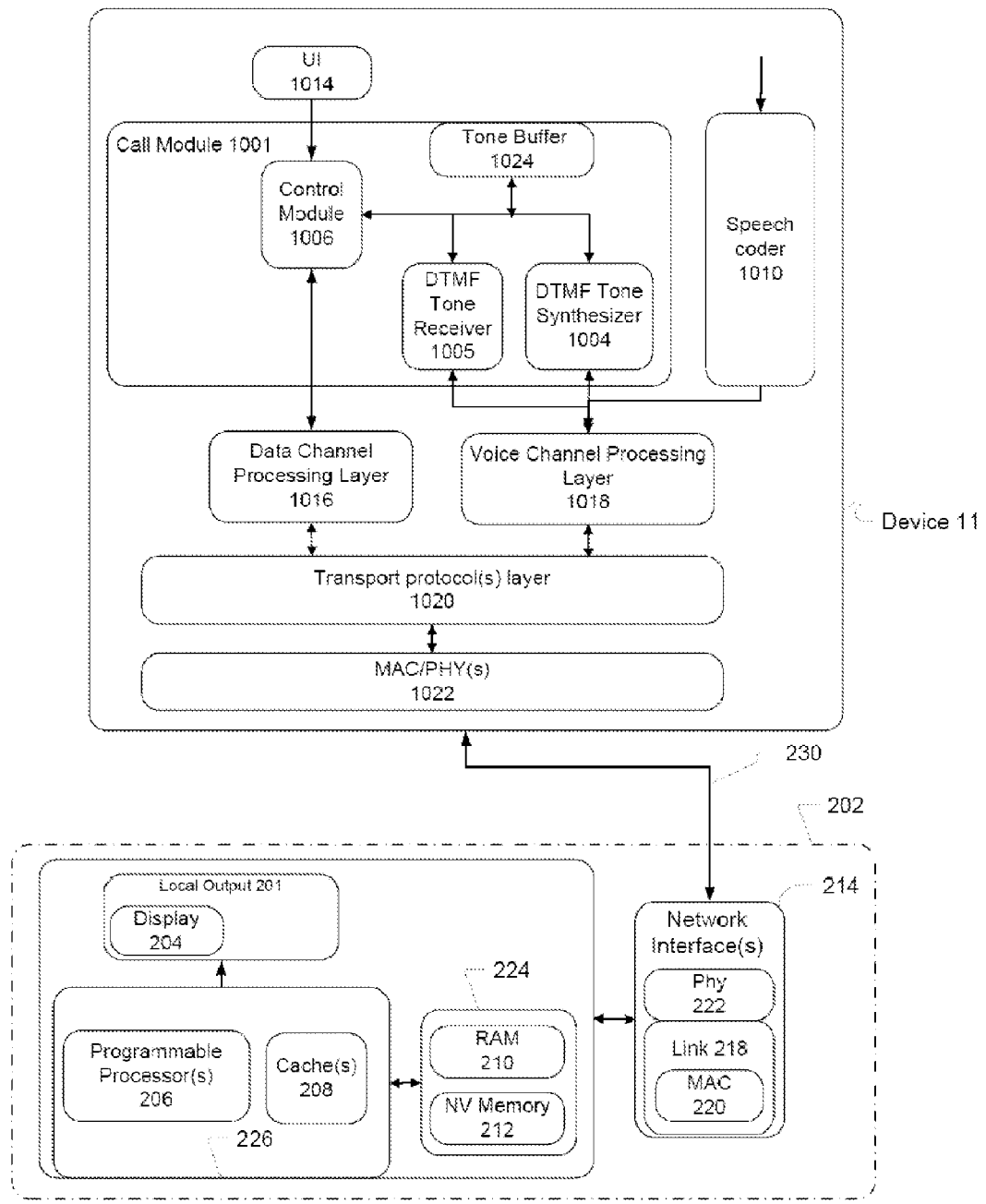
FIG. 8 illustrates an exemplary system for transmitting dual tone frequency tones to a mobile device.

FIG. 8 illustrates an example where a server 202 can provide voice services (for example, as well as other services typically provided by a PBX) to a mobile device 11, and use aspects disclosed herein for transmission of control and status information from server 202 to mobile device 11. Server 202, includes a local output module 201, which can include a display 204, or another suitable interface (e.g., a serial port or USB port, and so on). Server 202 also includes a communications module 214 that comprises one or more network interfaces, each having an associated link layer 218, which can comprise a Media Access Controller 220, as well as an associated physical layer 222. For example, a MAC/PHY combination can be provided for any of a variety of networking technologies. Here, server 202 is depicted as communicating at least over a voice channel 230 with device 11 (see the description relating to FIGS. 1-7B, for further detail concerning such voice channel communications and networks over which they can be established). As such, server 202 can be provided with a PSTN interface, such as a PRI trunk.

Server 202 also comprises a mass storage module 224 and a processing module 226. The processing module 226 may include a programmable processor 206 and memory to be used during processing, such as cache memories 208. Processing module 226 can be operatively coupled to local output module 201, such as to display 204 to display output thereon.

Mass storage 224, can be composed of a Random Access Memory 210 and of non-volatile memory 212. Non-volatile memory 212 can be implemented with one or more of Flash memory, PROM, EPROM, and so on. Non-volatile memory 212 can be implemented as flash memory, ferromagnetic, phase-change memory, and other non-volatile memory technologies. Non-volatile memory 212 also can store programs, device state, various user information, one or more operating systems, device configuration data, and other data that may need to be accessed persistently.

FIG. 8 also depicts an exemplary functional module organization of device 11. Structures (e.g., processor(s) 206) that can be used in implementing such functional modules were depicted with respect to server 202, while a logical representation of such functions is presented with respect to device 11; as will become apparent in the following disclosure, some functional modules depicted with respect to device 11 also may be implemented on server 202.

Call module 1001 identifies a logical organization of modules which can be used for implementing aspects described herein. A speech coder 1010 can do one or more of coding and decoding speech obtained and transmitted on the voice channel 230. Speech coder 1010 can provide inputs to a voice channel processing layer 1018. Both data channel processing layer 1016 and voice channel processing layer 1018 can send and receive data to and from transport protocol(s) layer 1020, which in turn communicates with MAC/PHY 1022. Control module 1006 can control functionality of the call module 1001 in response to commands received through voice channel 230. Status information received through voice channel 230 also can be used in updating outputs or other information for a user of device 11. Control module can provide outputs to and receive inputs from user interface (UI) 1014, which can comprise a display, speech output, a speaker, and so on.

In particular, DTMF tones transmitted to device 11 over the voice channel 230 are received at the DTMF tone receiver 1005. A tone buffer 1024 may store tones for reception and also can be used for storing tone data that will be used by DTMF tone synthesizer 1004 for synthesizing tones to be transmitted over voice channel 230. Thus, by way of explanation, a tone transmitted from server 202 transits voice channel 230, enters device 11 through MAC/PHY 1022, through voice channel processing 1018, and is decoded by DTMF tone receiver 1005, which can provide information encoded in such tone or tones to control module 1006, which can use that information. Tone buffer 1024 can be used both by receiver 1005 and by synthesizer 1004, and in some instances, these aspects are directed to situations where tone buffer 1024 is being used by synthesizer 1004 during certain times to generate a ring tone, and during those times, receiver 1005 will have difficulty recognizing DTMF tones that may arrive from voice channel 230.

A computer readable medium (e.g., mass storage 224) can store instructions for programming the processor 206 within the server 202 to transmit DTMF tones to the mobile device 11 over voice channel 230, established using a communications network. The processor 206 sends a ring-tone-start indication from the communication module 214 over the voice channel 230 and to the mobile device 11. The ring-tone-start indication may include a DTMF tone that triggers the mobile device 11 to start the cyclic ring tone. The cyclic ring tone may include a series of ring and pause periods.

The processor 206 estimates a delay incurred between the time at which the ring-tone-start indication is sent to the mobile device 11 and the time at which the cyclic ring tone starts. The delay may include a network transmission delay incurred during transmission of the ring-tone-start indication from the server 202, over the voice channel and to the mobile device 11. The network transmission delay may be empirically estimated on the enterprise network or another network with the use of test software. A default network transmission delay may also be assumed.

The delay may also include a processing delay incurred during processing of the ring-tone-start indication at the mobile device 11. The processing delay may include the time required for the ring-tone-start indication to travel through the voice channel processing layer 1018 and the tone receiver 1005 and the time required to synthesize the ring-tone-start indication at the tone synthesizer 1004 before it is sent to the control module 1006. The processor 206 can estimate a cyclic ring tone start time by recording the initial transmission time of the ring-tone-start indication and adding the delay incurred to send the indication and start the cyclic ring tone at device 11.

The processor 206 can schedule the transmission of a DTMF tone to be received at the mobile device 11. The algorithm is used to estimate when the DTMF tone will arrive at the mobile device 11 based on the cyclic ring-tone-start time, the estimated delay and the cadence of ring and pause periods of the cyclic ring tone. The cadence of ring and pause periods of the cyclic ring tone may be determined by sending a description of the cadence of the ring and pause periods of the cyclic ring tone from the mobile device 11 to the server 202 for processing. A default cadence of ring and pause periods of the cyclic ring tone may also be assumed. If the DTMF tone is estimated to arrive at the mobile device 11 during a pause period, then the server 202 sends the DTMF tone over the voice channel 230 to the mobile device 11 as scheduled. If the DTMF tone is estimated to arrive at the mobile device 11 during a ring period, then the server 202 reschedules the transmission of the DTMF tone to the mobile device 11 to be received during a pause period. The DTMF tone is sent to the mobile device 11 as rescheduled over the voice channel 230.

Figure 9:
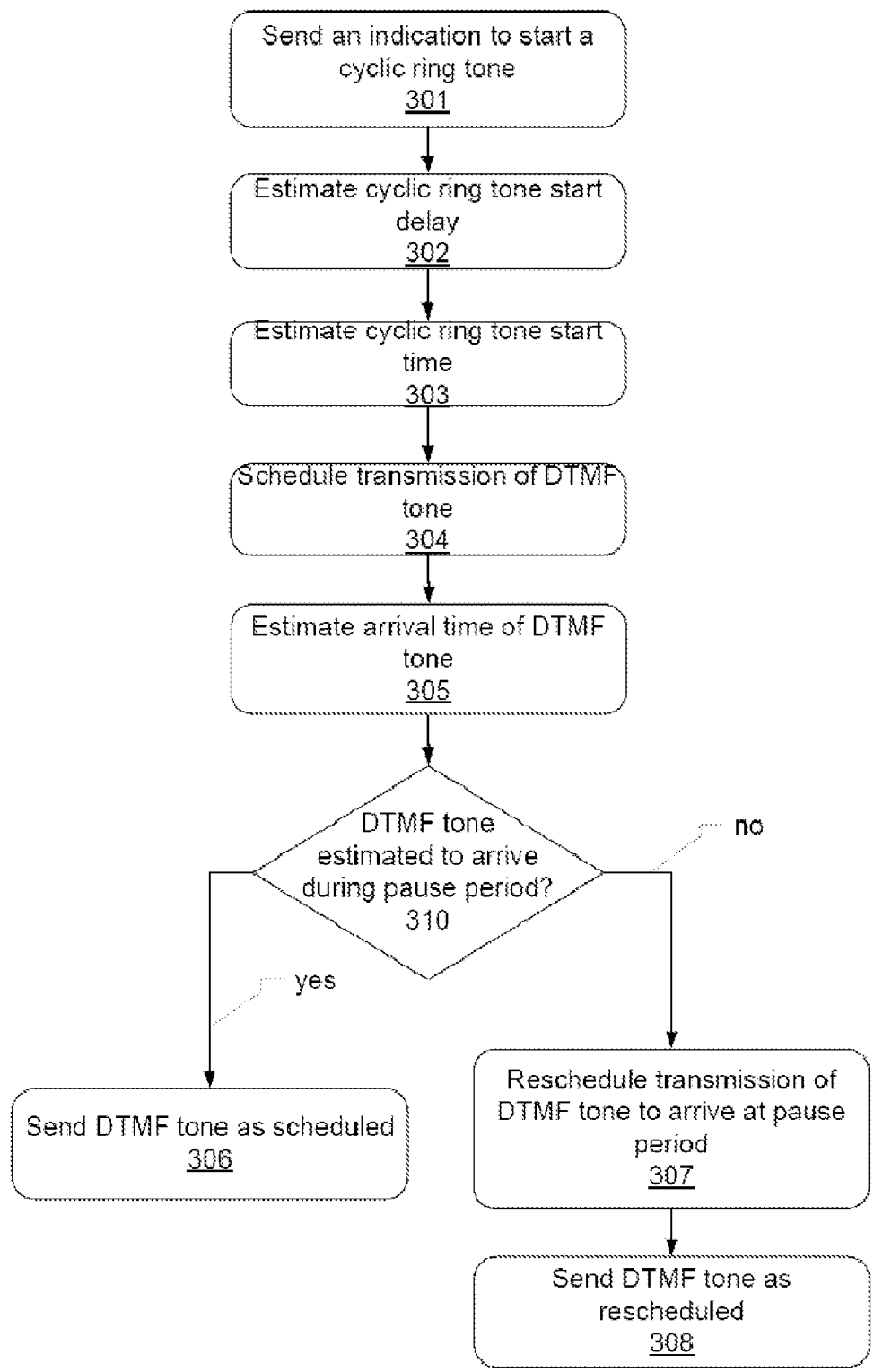
FIG. 9 illustrates a flow chart of an exemplary method for transmitting dual tone frequency tones to a mobile device.

FIG. 9 illustrates a flow chart of an exemplary method for transmitting dual tone frequency tones to a mobile device, in systems according to the example of FIG. 8. In step 301, server 202 can send a ring-tone-start indication to device 11, which device 11 will interpret as a command to begin producing a locally-audible cyclic ring tone. The ring-tone-start indication may be provided as a DTMF tone that has been mapped to a command to start generating the cyclic ring tone. The cyclic ring tone may include a series of ring and pause periods.

In step 302, the server estimates a delay incurred between the time the ring-tone-start indication is sent to the mobile device and the time at which the cyclic ring tone starts. The delay may include a network transmission delay incurred during transmission of the ring-tone-start indication from the server to the mobile device. The network transmission delay may be empirically estimated on the enterprise network or another network with the use of test software. A default network transmission delay may also be assumed. The delay may also include a processing delay incurred during processing of the ring-tone-start indication at the mobile device. In step 303, a cyclic ring tone start time at which the cyclic ring tone begins is estimated by recording, at the server, an initial transmission time at which the ring-tone-start indication is sent and by adding the delay incurred. An exemplary algorithm for calculating the cyclic ring tone start time is as follows:

cyclic_ring_tone_start_time = initial transmission time + network_transmission_delay + device_processing_delay.

In step 304, the server schedules the transmission of a DTMF tone to be received at the mobile device. In step 305, the server estimates an arrival time of the DTMF tone at device 11 (here, arrival meaning that device 11 has received and processed the tone, so that it can be outputted or otherwise used in control functions). In step 310, the server determines, based on the estimated arrival time of the tone, whether the DTMF tone will arrive at device 11 while device 11 is outputting a ring tone. Examples of how such a determination can be made are described in further detail below. In general, the determination is made based on the cyclic ring tone start time, the estimated delay and the cadence of ring and pause periods of the cyclic ring tone.

The cadence of ring and pause periods of the cyclic ring tone may be determined by sending a description of the cadence of the ring and pause periods of the cyclic ring tone from the mobile device to the server. A default cadence of ring and pause periods of the cyclic ring tone may also be assumed. If the DTMF tone is estimated to arrive at the mobile device during a pause period, then the server sends the DTMF tone to the mobile device as scheduled in step 306. If the DTMF tone is estimated to arrive at the mobile device during a ring period, then the server reschedules the transmission of the DTMF tone to the mobile device to be received at the mobile device during a pause period in step 307. In step 308, the DTMF tone is sent to the mobile device as rescheduled.

For step 310, an exemplary algorithm for scheduling and rescheduling the transmission of a DTMF tone to a mobile device is as follows:

```
txTimeInRingCycleFrame =
    mod((currTime − cyclic_ring_tone_start_time),
    ring_cycle_period);
arrivalTimeInRingCycleFrame = txTimeInRingCycleFrame +
    dtmf_delivery_delay;
if (arrivalTimeInRingCycleFrame => ring_duration) &&
    (arrivalTimeInRingCycleFrame < ring_cycle_period))
{The DTMF tone will likely arrive during PAUSE period no need to
    reschedule};
else {reschedule the transmission =currentTime + (ring_duration −
    arrivalTimeInRingCycleFrame)}.
```

In accordance with the embodiment illustrated in FIG. 9, the algorithm may be extended to reschedule the transmission to any pattern of cyclic ring tone. The server can record the cyclic ring tone start time (time that the server estimates device 11 started to ring, in response to a signal, e.g., a tone, to do so) with the use of the following algorithm:

```
cyclic_ring_tone_start_time = current_timestamp +
    dtmf_delivery_delay + device_processing_delay.
```

The cadence of ring and pause periods of the cyclic ring tone may be determined by providing a description of the cadence of the ring and pause periods of the cyclic ring tone to the server. A default cadence of ring and pause periods of the cyclic ring tone may also be assumed. An exemplary algorithm describing the cadence of a cyclic ring tone including ring periods and pause periods is as follows:

```
cycle_pattern = {{ ring_duration1, pause_duration1, ring_pause_period1}; {
ring_duration2, pause_duration2, ring _ pause_period2}; { ring _duration3,
pause_duration3, ring _ pause_period3}}.
```

The cyclic ring tone may have any number of ring and pause periods per cycle and more generally, pause period timing per cycle may be calculated with the following algorithm:

ring_pause_period(x)=ring_duration(x)+pause_duration(x).

The server schedules the transmission of a DTMF tone to be received at the mobile device by first estimating the time within a cycle (within a frame of a cycle) at which the tone will arrive at the mobile device by using the following algorithm (because the ring tone repeats, a modulo calculation provides the time, within a given cycle, at which the tone will be expected to arrive):

```
txTimeInCycleFrame = mod((current_time − cycle_start_time),
    cycle_period);
arrivalTimeInCycleFrame = txTimeInCycleFrame +
    dtmf_delivery_delay.
```

To determine if the transmission of the DTMF tone should be rescheduled the server determines if the estimated arrival of the tone overlaps with any ring periods of the cyclic ring tone by using the following algorithm:

```
reschedule = true;
for ( y = 0; y < number of patterns in cycle_pattern; y++ ) { if( y == 0 )
    {ring_pause_period(y−1) = 0 }
    if ( ring_pause_period(y−1)+ring_duration(y)
    <= arrivalTimeInCycleFrame <
    ring_pause_period(y−1)+ring_pause_period(y)
    ) { reschedule = false }}.
```

If the DTMF tone is estimated to arrive at the mobile device during a ring period the server reschedules the transmission of the tone to arrive at the device during a pause period by using the following algorithm:

```
if( reschedule = true ) rescheduleTxTime = current_Time +
    ( (ring_duration(y)+ring_pause_period(y−1) −
    arrivalTimeInCycleFrame).
```

The above formulas and other pseudocode are exemplary and those of ordinary skill in the art would be able to use these examples to produce adaptations and changes to arrive at particular variations that remain within the scope of these disclosures.

Also, block diagrams and examples of system components and functional modules were provided as examples, and not by way of any express or implied limitation as to how any aspect disclosed can be practiced in a particular embodiment.

The above description occasionally describes relative timing of events, signals, actions, and the like as occurring "when" another event, signal, action, or the like happens. Such description is not to be construed as requiring a concurrency or any absolute timing, unless otherwise indicated. Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

What is claimed is:

1. A computer-implemented method for transmitting dual tone multi-frequency (DTMF) tones to a mobile device over a network, comprising:

indicating, to the mobile device, to start, at a start time, a cyclic ring tone comprising ring and pause periods;

estimating a delay incurred to send, over the network, a DTMF tone for reception at the mobile device;

scheduling the transmission of the DTMF tone to be received at the mobile device during a pause period of the cyclic ring tone based on the start time and the estimated delay; and transmitting, over the network, the DTMF tone as scheduled.

2. The method as recited in claim 1, wherein the delay comprises a network transmission delay for transmitting the DTMF tone to the mobile device over the network.

3. The method as recited in claim 1, wherein estimating further comprises empirically determining delay incurred during processing the DTMF tone at the mobile device.

4. The method as recited in claim 1, wherein the scheduling comprises subtracting the start time from a present time, dividing that result modulo by a period of the cycle of the cyclic ring tone and determining whether a value of the remainder falls within either a pause period or a ring period of the cycle.

5. The method as recited in claim 1, wherein the start time is approximated based on a current time at the indicating step, plus the estimated delay.

6. The method as recited in claim 1, wherein the scheduling further comprises rescheduling the transmission of the DTMF tone in response to a determination that the DTMF tone will arrive at the mobile device during a ring period, if sent at an originally-determined transmission time.

7. The method as recited claim 1, further comprising receiving a description of the ring/pause cadence of the cyclic ring tone and using the description of the cadence of the cyclic ring tone, the start time and the estimated delay to estimate when one or more pause periods will occur.

8. The method as recited in claim 1, wherein estimating comprises assuming a default network transmission delay for transmitting the DTMF tone to the mobile device over the network.

9. The method as recited in claim 1, wherein the indicating comprises transmitting over the network a DTMF tone, for reception by the mobile device.

10. A system for transmitting dual tone multi-frequency (DTMF) tones to a mobile device over a network, comprising:
a network interface;
a processor; and
a computer readable medium storing instructions for programming the processor to perform a method comprising:
indicating, to a mobile device, to start, at a start time, a cyclic ring tone comprising ring and pause periods,
estimating a delay incurred for the mobile device to receive a DTMF tone,
scheduling the transmission of the DTMF tone to be received at the mobile device during a pause period of the cyclic ring tone based on the start time and the estimated delay, and
transmitting the DTMF tone as scheduled.

11. The system as recited in claim 10, wherein the delay comprises a network transmission delay for transmitting the DTMF tone to the mobile device over the network.

12. The system as recited in claim 10, wherein estimating further comprises empirically determining delay for processing the DTMF tone at the mobile device.

13. The system as recited in claim 10, wherein the start time is determined based on a current time at the indicating step, plus the estimated delay.

14. The system as recited in claim 10, wherein the scheduling further comprises rescheduling the transmission of the DTMF tone in response to a determination that the DTMF tone will arrive at the mobile device during a ring period.

15. The system as recited claim 10, further comprising using a cadence of the cyclic ring tone, the start time and the estimated delay to estimate when a pause period will occur.

16. A tangible computer readable medium having computer readable program code embodied therein for programming a computer system to perform a method comprising:
indicating, to a mobile device, to start, at a start time, a cyclic ring tone comprising ring and pause periods;
estimating a delay incurred to send, over the network, a DTMF tone for reception at the mobile device;
scheduling the transmission of the DTMF tone to be received at the mobile device during a pause period of the cyclic ring tone based on the start time and the estimated delay; and
transmitting the DTMF tone as scheduled.

17. The computer readable medium as recited in claim 16, wherein the delay comprises a network transmission delay for transmitting the DTMF tone to the mobile device over the network.

18. The computer readable medium as recited in claim 16, wherein estimating further comprises empirically determining delay for processing the DTMF tone at the mobile device.

19. The computer readable medium as recited in claim 16, wherein the start time is determined based on a current time at the indicating step, plus the estimated delay.

20. The computer readable medium as recited in claim 16, wherein the scheduling further comprises rescheduling the transmission of the DTMF tone in response to a determination that the DTMF tone will arrive at the mobile device during a ring period.

21. A computer-implemented method for transmitting dual tone multi-frequency (DTMF) tones to a mobile device over a network, comprising:
estimating a start time of the cyclic ring tone at the mobile device, based on a time at which an indication to begin the cyclic ring tone was sent over the network, and an estimated delay until the cyclic ring tone started at the mobile device;
scheduling the transmission of the DTMF tone to be received at the mobile device during a pause period of a cyclic ring tone, based on at least the estimated delay, that comprises one or more pause periods and one or more ring periods; and
transmitting, over the network, the DTMF tone as scheduled.

22. The method of claim 21, wherein the delay comprises a network transmission delay and a processing delay at the mobile device.

* * * * *